US012648832B1

(12) United States Patent
Alshehri et al.

(10) Patent No.: US 12,648,832 B1
(45) Date of Patent: Jun. 9, 2026

(54) BIOCERAMIC PUTTY PLACEMENT INSTRUMENT

(71) Applicant: KING SAUD UNIVERSITY, Riyadh (SA)

(72) Inventors: Mohammed Abdullah Alshehri, Riyadh (SA); Ibraheem Rshood Alqwizany, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/432,710

(22) Filed: Dec. 24, 2025

(51) Int. Cl.
*A61C 5/50* (2017.01)

(52) U.S. Cl.
CPC ..................................... *A61C 5/50* (2017.02)

(58) Field of Classification Search
CPC .... A61C 3/08; A61C 3/06; A61C 5/50; A61C 5/60; A61C 5/68; A61C 5/44; A61C 5/55
See application file for complete search history.

(56) References Cited

U.S. PATENT DOCUMENTS

| | | | | | |
|---|---|---|---|---|---|
| 860,555 | A | * | 7/1907 | Middaugh | A61C 5/62 433/81 |
| 881,469 | A | * | 3/1908 | Hale | A61C 5/50 433/81 |
| 1,818,627 | A | * | 8/1931 | Kerr | A61C 5/50 433/164 |
| 2,603,871 | A | * | 7/1952 | Call | A61C 5/50 433/164 |
| 3,781,996 | A | * | 1/1974 | Saffro | A61C 5/44 433/75 |
| 4,353,698 | A | * | 10/1982 | McSpadden | A61C 5/50 433/32 |
| 4,758,156 | A | * | 7/1988 | Johnson | A61C 5/50 433/81 |
| 4,797,082 | A | * | 1/1989 | Hughes | C04B 30/02 100/208 |
| 4,894,011 | A | | 1/1990 | Johnson | |
| 5,605,460 | A | * | 2/1997 | Heath | A61C 5/50 433/102 |
| 5,658,149 | A | * | 8/1997 | Munce | A61C 5/40 433/102 |
| 6,312,261 | B1 | * | 11/2001 | Mays | A61C 5/50 433/32 |

(Continued)

FOREIGN PATENT DOCUMENTS

| | | | | | |
|---|---|---|---|---|---|
| CA | 2244655 | A1 | * | 2/1999 | A61K 6/71 |
| WO | WO-2007060023 | A1 | * | 5/2007 | A61K 6/864 |

*Primary Examiner* — Heidi M Eide
(74) *Attorney, Agent, or Firm* — Nath, Goldberg & Meyer; Joshua B. Goldberg

(57) ABSTRACT

An obturation apparatus for prepared root canals incorporates the functionality of an endodontic spreader but with a circular disk located at a fixed distance from a distal tip of the apparatus and regulates the length of bioceramic putty inserted into the prepared root canal. The instrument comes in various sizes to cater to prepared root canals of differing dimensions such that the apparatus must be prefit before the application of the bioceramic putty to the apparatus tip before extending the bioceramic putty to the distal side of the circular disk. The apparatus is then inserted to a desired depth with application of apical pressure leaving the bioceramic putty in place as an apical plug when the apparatus is removed.

1 Claim, 1 Drawing Sheet

(56) References Cited

U.S. PATENT DOCUMENTS

| | | | |
|---|---|---|---|
| 7,303,817 B2 | 12/2007 | Jia | |
| 9,023,917 B2 | 5/2015 | Berger | |
| 2004/0265082 A1* | 12/2004 | Abrams | A61C 19/043 408/226 |
| 2012/0329006 A1 | 12/2012 | Pierson et al. | |
| 2013/0171581 A1 | 7/2013 | Mccafferty et al. | |
| 2022/0211586 A1 | 7/2022 | Yokota et al. | |

* cited by examiner

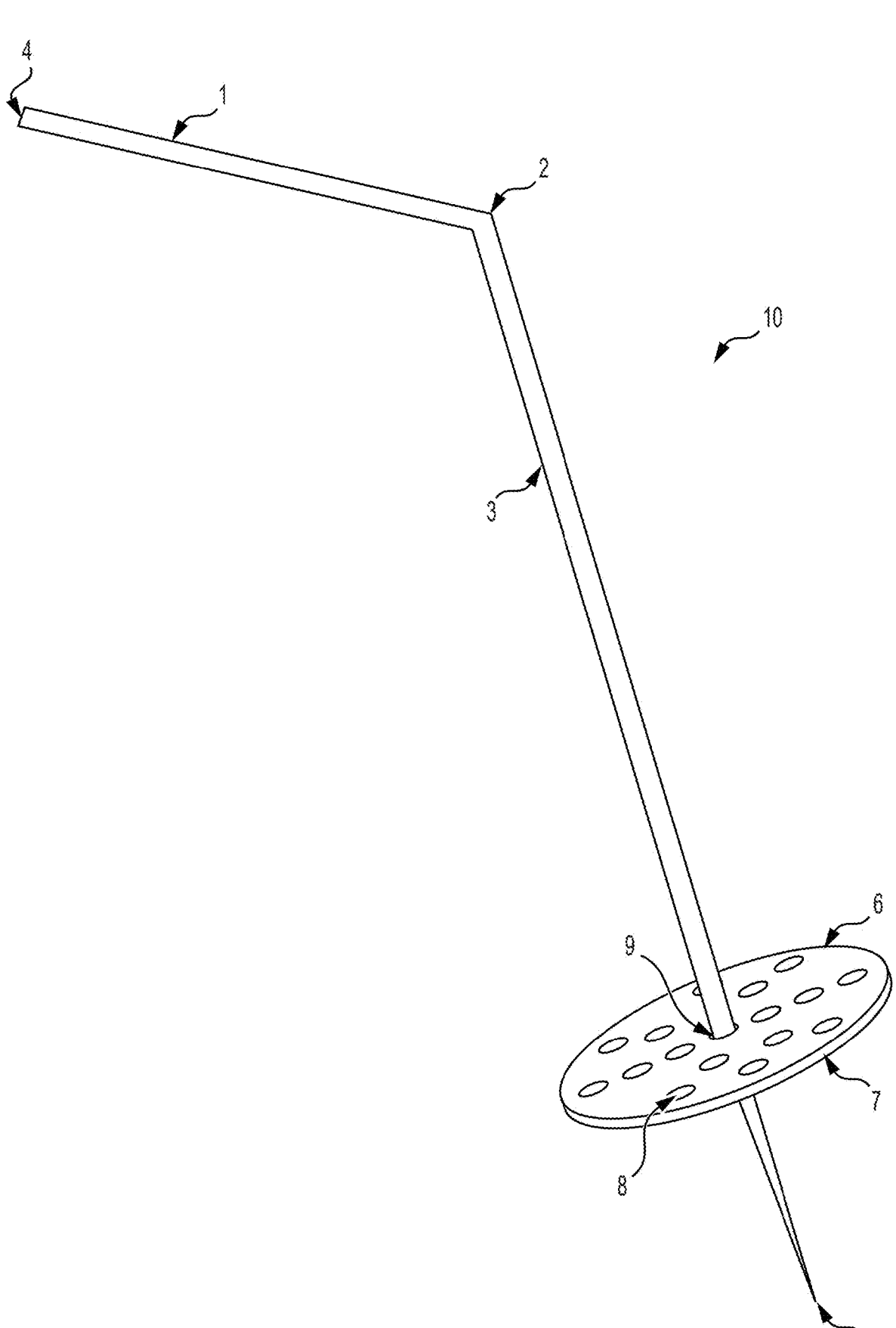

BIOCERAMIC PUTTY PLACEMENT INSTRUMENT

BACKGROUND

1. Field

The present disclosure relates generally to enhancements to a root canal instrument used in the field of dental surgery, and more particularly relates to the placement and manipulation of a bioceramic putty placement instrument during a root canal obturation procedure.

2. Description of the Prior Art

The standard technique in performed obturations for a dental root canal involves the insertion of a filling composition into an already prepared root canal ready to receive the filling composition. Commercially known endodontic filling compositions usually comprise a mixture of balata, zinc oxide, heavy metal sulfates, and wax. Balata based cones in particular have been in common usage for many years. However, the problem with their usage is that balata based cones cannot always be easily introduced into a prepared root canal. This is because, after introduction of the filling composition into the prepared root canal, a spreader or spreading type tool is needed and therefore used to condense the filling composition both in the lateral direction and vertically along the length of the prepared root canal to produce a closely packed arrangement of the filling composition material to the prepared root canal. Sometimes, the spreader or spreading tool is heated in order to perform this step.

Accordingly, a need exists for an endodontic filling composition which does not shrink after introduction into a prepared root canal. Additionally, feasibility for obturation use requires that the endodontic filling composition possess physical properties which facilitate its introduction into the prepared root canal. Specifically, the filling composition must be extrudable so as to be injectable into the root canal at an elevated, but clinically acceptable, temperature. However, the composition must solidify and remain solid at body temperature after final placement within the prepared root canal.

The prior art has attempted to formulate a thermoplastic endodontic filling composition. For example, U.S. Pat. No. 4,483,679 to Fujisawa et al., discloses the use of thermoplastic endodontic filling materials which are injectable at clinically acceptable conditions. The compositions of this disclosure comprise mixtures of balata or isoprene polymer or paraffin wax to provide filling compositions with relatively low softening temperatures.

U.S. Pat. No. 4,632,977 to Riazzi discloses a process for altering the thermoplasticity of balata or isoprene polymer to produce a dental filling composition that is injectable by a manual syringe at clinically acceptable temperatures. The process involves a heat treatment during which a high shear force is applied to the molten polymer to masticate and clip the chain length of the polymer until the melt index of the polymer reaches 50.0 gm/min.

The endodontic filling compositions produced according to these disclosures, however, are costly to manufacture and lack the resilience of the conventional balata cone. Thus, it is desirable to produce an endodontic filling material that is easily introduced into a prepared root canal which seals the canal both in the lateral direction and vertically along the length of the prepared root canal without shrinkage.

None of the previously disclosed solutions, whether taken singly or in combination, meets the problems associated with spreading of bioceramic putty within a prepared root canal as discussed above. Accordingly, what is needed is a spreader or spreading tool for the introduction of bioceramic putty into a prepared root canal.

SUMMARY

In light of the disadvantages of the presently known solutions, the following summary is provided to facilitate an understanding of some of the innovative features as described herein and is not intended as a full description. A full appreciation of the various aspects of the present subject matter can be gained by analysis of the entire specification, accompanying FIGURE(s), abstract, and claims as a whole.

The presently described innovative tool bears a striking resemblance to an endodontic spreader with the unique addition of a disk positioned precisely 4 mm from its distal tip. The disk serves a crucial purpose in regulating the length of bioceramic putty that is inserted into the prepared root canal, ensuring optimal results. The spreader or spreader instrument is available in multiple sizes, providing the dentist or endodontist with the flexibility to choose the perfect fit for each individual case.

Accordingly, it is an object of the presently described subject matter to provide a novel and improved form of a bioceramic putty placement tool or instrument.

It is an additional object of the presently described subject matter to develop a tool that resembles a conventional endodontic spreader with the modification of an added 4 mm disk located in close proximity to the endodontic tip where the disk serves to regulate the length of the bioceramic putty that is deposited in the prepared root canal, thus facilitating its management.

It is a further object of the presently described subject matter to equip dentists or endodontists with a variety of instrument sizes to choose from, ensuring that a perfect fit is achieved for each individual case of the prepared root canal.

It is an additional object of the presently described subject matter to provide a robust filling composition material that can withstand the forces experienced during root canal insertion. This is critical in ensuring the efficient functionality of the presently described instrument and minimizing any potential damage to the patient that may occur. Accordingly, it is imperative that the filling composition material used herein be of high strength and durability to ensure the longevity of the presently described instrument.

It is a further object of the presently described subject matter to increase the efficiency of root canal obturation procedures with the utilization by the device of a non-reactive material for the disk in the placement of the bioceramic putty. This approach can be particularly advantageous in a business or academic environment where high standards of quality and precision are required and expected. By employing such non-reactive materials, it is possible to achieve optimal results while minimizing the risk of adverse reactions or complications and thus reducing the possibilities of unfavorable patient outcomes.

It is an additional object of the presently described subject matter to provide a new and improved form of a bioceramic putty placement instrument. Other aspects, advantages and novel features of the presently described subject matter will become apparent from the detailed description when considered in conjunction with the accompanying drawing(s).

This summary was provided merely for the purposes of distilling the essential features of some of the embodiments of the presently described subject matter, so as to provide a basic understanding of some aspects of the subject matter described therein. Accordingly, it will be appreciated that the above described features are merely examples and should not be construed to narrow the scope or spirit of the subject matter described herein in any way. Other features, aspects, and advantages of the subject matter described herein will become apparent from the following Detailed Description, FIGURE(s), and Claims.

BRIEF DESCRIPTION OF THE DRAWINGS

The sole provided FIGURE shows a perspective view of the endodontic spreading tool or instrument with the circular disk attached.

Similar reference characters denote corresponding features consistently throughout the attached drawing(s).

DETAILED DESCRIPTION OF THE PREFERRED EMBODIMENTS

It is noted that, as used in this specification and the appended claims, the singular forms "a", "an", and "the" include plural references unless the context clearly dictates otherwise.

As described herein, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" herein should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, percentage ranges or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Detailed descriptions of the preferred embodiment(s) are provided herein. It is understood, however, that the presently described subject matter may be embodied in various forms. Therefore, specific details disclosed herein are not to be interpreted as limiting, but rather as a basis for the claims and as a representative basis for teaching one skilled in the art to employ the presently described subject matter in any appropriately detailed system, structure, or manner.

FIG. 1 discloses an embodiment of the presently described device, i.e., an endodontic spreader tool (10) or instrument with the novel modification of being equipped with a disk (6) positioned 4 mm from the tip (5) of the endodontic spreader tool (10) or instrument. This disk (6) serves to regulate the length of bioceramic putty inserted into a prepared root canal.

The endodontic spreader tool (10) or instrument has three main elements. These three main elements include or consist of a handle section (1) which has a first length and which is connected to a shaft (3) or stylus which has a second length greater than the length of the first length of the handle. The shaft (3) or stylus of the endodontic spreader (10) or instrument has a distal end which is tapered to a point (5). The handle (1) of the endodontic spreader tool (10) or instrument has a proximal end (4) and a distal end which connects to a proximal end of the shaft (3) or stylus at a bend (2). The endodontic spreader tool (10) or instrument can be used in conjunction with a prepared root canal which is produced by mechanically creating a tooth access cavity and removing a portion of the inner tissue, leaving the prepared tooth space open to a patient's mouth. The space in the prepared root canal may be optionally cleaned, washed, rinsed, or sterilized, etc. in conjunction with use of the present endodontic spreader tool (10) or instrument.

The handle (1), the shaft (3) or stylus, and the disk (6) of endodontic spreader tool (10) or instrument are integral with each other such that the handle (1), the shaft (3) or stylus, and the disk (6) of endodontic spreader tool (10) or instrument form an elongated slender apparatus. The shaft (3) or stylus tapers to the tip (5) and can have a textured or matte finished external surface that extends proximally 4 mm from the tip of the shaft (3) or stylus to the circular disk (6). The textured or matte finished external surface of the tapered portion of the shaft (3) or style is adaptable to receive and retain bioceramic putty, which is used to fill the prepared root canal.

In one embodiment the handle (1), the shaft (3) or stylus, and/or the disk (6) of endodontic spreader tool (10) or instrument is made of, contains, comprises, or is coated with a biocompatible metal or a non-metal. In the one embodiment, the handle (1), the shaft (3) or stylus, and/or the disk (6) of the endodontic spreader tool (10) or instrument are made of the same biocomptabile metal. In a second one embodiment, the handle (1), the shaft (3) or stylus, and/or the disk (6) of the endodontic spreader tool (10) or instrument are made of the different respective biocomptabile metals. Examples of biocompatible metals useful herein include, but are not limited to, stainless steel, aluminum, cobalt, zirconium, and titanium, as well as any combination thereof. Examples of biocompatible non-metals useful herein include but are not limited to polylactic acid (PLA), poly(lactic-co-glycolic acid) (PLGA), polyvinylchloride (PVC), polyethylene terephthalate (PET), acrylonitrile butadiene styrene (ABS), polypropylene (PP), polystyrene (PS), polytetrafluoroethylene (PTFE), polyetheretherketone (PEEK), polyetherketoneketone (PEKK), polycarbonate (PC), silicone, polyurethane, glass, carbon fiber, and/or ceramic, as well as any combination thereof. In one embodiment, the non-metal may be a thermoplastic elastomer (TPE) such as a styrenic block copolymer (TPE-s), a thermoplastic olefin (TPE-o), an elastomeric alloy (TPE-v or TPV), a thermoplastic polyurethane (TPU), a thermoplastic copolyester (TPE-E), or a thermoplastic polyamide, as well as any combination thereof. For the avoidance of doubt, the handle (1), the shaft (3) or stylus, and the disk (6) of endodontic spreader tool (10) or instrument may be made of, contain, comprise, or coated with any combination of the aforementioned biocompatible metals and/or non-metals.

Alternatively, the handle (1), the shaft (3) or stylus, and/or the disk (6) of the endodontic spreader tool (10) or instrument comprises a non-biocompatible metal or non-metal, but the exterior surface of either may be coated with a biocompatible metal or non-metal.

In one embodiment, the handle (1), the shaft (3) or stylus, and/or the disk (6) of the endodontic spreader tool (10) or instrument comprises a plastic which contains metal, glass, ceramic, carbon, or polymer fibers. The plastic may be any of those previously described or may be some other plastic. In this embodiment, the plastic may contain about 0.001 to about 0.01 wt %, about 0.01 to about 0.1 wt %, about 0.1 to about 1 wt %, about 1 to about 3 wt %, about 3 to about 5 wt %, or about 5 to about 10 wt % metal fibers, glass fibers, ceramic fibers, carbon fibers, and/or polymer fibers relative to a total weight of the plastic and total fiber content. In some embodiments, the plastic may contain greater than 10 wt % metal, glass, ceramic, carbon, or polymer fibers relative to a total weight of the plastic and fibers. Ideally, this incorporation of fibers into the plastic is to improve durability of the dental instrument or improve an aspect of its manufacturing.

In one embodiment, the handle (1), the shaft (3) or stylus, and/or the disk (6) of the endodontic spreader tool (10) or instrument is independently made of, contains, or is coated with a non-stick material. A "non-stick" material, coating, or film is one to which dental materials, such as restorative materials, do not substantially adhere. In one embodiment, this non-stick material may be polytetrafluoroethylene (PTFE), which is commonly known as TEFLON®, or may be fluorinated ethylene propylene, perfluoroalkoxy copolymers, carbon fibers, anodized aluminum, ceramic, silicone, an ultrahydrophobic material, or a self-cleaning material. In another embodiment, a non-stick material may be formed by a textured solid surface having an adsorbed impregnating liquid, such as LIQUIGLIDE®. In some embodiments, silicone rubber may be considered to be a non-stick material. In a related embodiment, the handle (1), the shaft (3) or stylus, and the disk (6) of the endodontic spreader tool (10) or instrument may be coated with a non-stick lubricant such as a petroleum distillate.

In one embodiment, the handle (1), the shaft (3) or stylus, and the disk (6) of the endodontic spreader tool (10) or instrument is made of, contains, or is coated with at least one material having a Shore A hardness (ASTM D2240 00) ranging from about 20 to about 80, about 25 to about 75, or about 30 to about 70. In other embodiments, the handle (1), the shaft (3) or stylus, and the disk (6) of the endodontic spreader tool (10) or instrument is made of, contains, or is coated with at least one material having a Shore A hardness of greater than 20 or less than 80.

FIG. 1 also discloses a circular disk (6) positioned 4 mm from the tip (5) at the distal end of the endodontic spreader tool (10) or instrument. The circular disk (6) has a circumferential edge (7) and is perforated with a plurality of holes (8) radially displaced about the center of the circular disk (6) along its periphery. Furthermore, a central hole (9) is provided in the circular disk (6) for the shaft (3) or stylus of the endodontic spreader tool (10) or instrument to slide into and position the circular disk (6) at 4 mm above the distal end of the tip (5) of the endodontic spreader tool (10) or instrument. The circular disk (6) is an active element in that it provides flow control and levelling control and is precisely engineered to meter, stop, and uniformly distribute the bioceramic putty within the prepared root canal.

In one employment of the endodontic spreader tool (10) or instrument of this disclosure, the endodontic spreader tool (10) or instrument can be provided in sets having different shafts (3) or styluses of varying nominal diameters. The diameter of a prepared root canal varies considerably and for effectively filling endodontically prepared root canals, the endodontic spreader tool (10) or instrument having a shaft (3) or stylus of a diameter which is less than but approximates that of the prepared root canal of a patient is preferred. For this reason, the endodontic spreader tools (10) or instruments are typically supplied in sets of varying shaft (3) or stylus diameters. In accordance with the different sized shaft (3) or stylus diameters of each endodontic spreader (10) or instrument in the set, the corresponding central holes (9) of the respective the circular disks (6) would also be sized to match the different sized shaft (3) or stylus diameters. The shaft (3) or stylus diameter of each endodontic spreader (10) or instrument of the set is preferably indicated on the handle (1).

The plurality of holes (8) radially displaced about the central hole (9) of the circular disk (6) along its periphery serves a dual technical purpose. Firstly, the plurality of holes (8) provides pressure equalization and venting, allowing excess bioceramic putty material and trapped air to escape thus preventing apical extrusion. Secondly, the plurality of holes (8) ensures a uniform condensation as the plurality of holes (8) distributes lateral forces symmetrically about the longitudinal axis of the shaft (3) or stylus of the endodontic spreader tool (10) or instrument, ensuring homogeneous compaction of the bioceramic putty. In this regard, the endodontic spreader tool (10) or instrument may compact the bioceramic putty in a prepared root canal to eliminate as much as possible, or substantially reduce any voids and to cause the bioceramic putty to flow into lateral fissures that frequently characterize prepared root canals.

The defined spatial geometry of the disk (6) with respect to the active tip (5) of the shaft (3) or stylus of the endodontic spreader tool (10) or instrument includes a 4 mm offset of the circular disk (6) proximally from the active tip (5) of the shaft (3) or stylus. This 4 mm proximal offset between the disk (6) and the active tip (5) is functionally calibrated for endodontic root canal depth control and creates a built-in mechanical stop and depth reference, enabling reproducible placement, and preventing over insertion.

As shown in FIG. 1, the endodontic spreader tool (10) or instrument integrates the delivery mechanism and condensation process control in root canal obturations by combining the three sequential actions of delivery, levelling, and condensation within the single endodontic spreader tool (10) or instrument, eliminating the need for separate delivery and spreader tools usually relied upon in the prior art. This integration yields a novel workflow and operational efficiency with clear clinical advantages.

The geometry of the circular disk (6) and the spacing of the plurality of holes (8) are optimized specifically for bioceramic putty rheology, which has different viscosity and flow dynamics than the filling composition materials discussed in the prior art. Preferred bioceramic materials useful in this regard can be selected from the group ceramic of mineral trioxide aggregates (MTA), bioglass, calcium silicates, calcium phosphates, calcium hydroxides and calcium sulfates, as well as any combination thereof.

In use in an associated method, the dental practitioner may initiate the procedure by evaluating the endodontic spreader tool (10) or instrument's compatibility with the prepared root canal until a seamless fit is achieved from the set of endodontic spreader tools (10) or instruments as already discussed above. Next, the pliable bioceramic putty is applied to active tip (5) and extended back towards the distal side of the disk (6) by manipulating the putty to stretch along the 4 mm distance between the distal end of the disk (6) and the active tip (5). The endodontic spreader tool (10) or instrument with the bioceramic putty now attached at the tip (5) is then meticulously inserted into the prepared root canal at the desired depth and desired pressure towards the apical constriction of the prepared root canal. When the endodontic spreader tool (10) or instrument is inserted into a prepared root canal with the bioceramic putty attached to its tip (5) as discussed above, the dental practitioner should position the tip (5) of endodontic spreader tool (10) or instrument at the root canal's full depth as close as is practically possible to the prepared root canal's apex and apply apical pressure leaving the bioceramic putty in place as an apical plug. The presence of the disk (6) prevents the bioceramic putty from rising beyond a desired height of the prepared root canal and any extra putty protruding through the plurality of holes (8) can be leveled off to be an even surface such that the bioceramic putty remains shaped as a plug at the apical end of the prepared root canal.

The endodontic spreader tool (10) or instrument helps to control the length and extent of the apical plugs which is important in ensuring the success of endodontic treatments.

Additionally, the endodontic spreader tool (10) or instrument is a much easier alternative to conventional devices and methods of placing bioceramic putty or bioceramic filling composition materials into a prepared root canal of a patient, such as conventional syringes or extruding devices.

It is to be understood that the endodontic spreader tool or instrument is not limited to the specific embodiment(s) described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of performing obturations in a prepared root canal of a patient, the method comprising:

selecting an endodontic spreader sized to fit the prepared root canal of the patient, wherein the endodontic spreader comprises:

a handle portion having a distal end and a proximal end;

a shaft or stylus having a distal end and a proximal end, the proximal end of the shaft or stylus being connected to the proximal end of the handle portion, and the shaft or stylus having a tapered portion that terminates in a tip at the proximal end of the shaft or stylus; and a circular disk situated 4 mm from the tip at the proximal end of the shaft or stylus wherein the circular disk is perforated by a plurality of holes along a periphery of the circular disk, wherein the tip is configured to hold a portion of bioceramic putty;

placing the portion of bioceramic putty on the tip at the proximal end of the shaft or stylus of the selected endodontic spreader;

proximally extending the portion of the bioceramic putty on the tip at the distal end of the shaft or stylus of the selected endodontic spreader towards a distal end of the circular disk such that the extended portion of the bioceramic putty is manipulated to stretch along the 4 mm distance between the circular disk and the tip of the shaft or stylus of the selected endodontic spreader;

inserting the selected endodontic spreader into the prepared root canal of the patient such that a desired depth of the prepared root canal is reached;

applying apical pressure to the selected endodontic spreader leaving the portion of the bioceramic putty as an apical plug;

preventing the portion of the bioceramic putty from rising beyond a desired height of the prepared root canal by levelling off any extra putty protruding through the plurality of holes of the circular disk to be an even surface such that the portion of the bioceramic putty remains shaped as a plug at the apical end of the prepared root canal; and removing the endodontic spreader from the prepared root canal of the patient.

*   *   *   *   *